United States Patent
Abi-Saleh et al.

(10) Patent No.: US 7,102,765 B1
(45) Date of Patent: Sep. 5, 2006

(54) APPARATUS AND METHOD FOR AUTOMATED TESTING OF PRINT DRIVERS IN A COMPUTER SYSTEM

(75) Inventors: Hanna Abi-Saleh, Cambridge, MA (US); Hee Tseng, Chelmsford, MA (US)

(73) Assignee: Zoran Corporation, Sunnyvale, CA (US)

( * ) Notice: Subject to any disclaimer, the term of this patent is extended or adjusted under 35 U.S.C. 154(b) by 0 days.

(21) Appl. No.: 09/495,459

(22) Filed: Feb. 1, 2000

(51) Int. Cl.
   *H04N 1/40* (2006.01)
(52) U.S. Cl. ..................... 358/1.13; 358/468
(58) Field of Classification Search ...... 358/1.13–1.16, 358/504, 406, 1.9, 468
   See application file for complete search history.

(56) References Cited

U.S. PATENT DOCUMENTS

| | | | | |
|---|---|---|---|---|
| 4,556,959 A | * | 12/1985 | Allen et al. | 400/70 |
| 5,337,258 A | * | 8/1994 | Dennis | 714/47 |
| 5,644,682 A | * | 7/1997 | Weinberger et al. | 358/1.1 |
| 5,713,032 A | * | 1/1998 | Spencer | 715/515 |
| 5,995,724 A | * | 11/1999 | Mikkelsen et al. | 358/1.16 |
| 6,039,426 A | * | 3/2000 | Dobbs | 347/19 |
| 6,268,924 B1 | * | 7/2001 | Koppolu et al. | 358/1.13 |

* cited by examiner

*Primary Examiner*—Thomas D. Lee
*Assistant Examiner*—Stephen Brinich
(74) *Attorney, Agent, or Firm*—Morgan, Lewis & Bockius LLP

(57) ABSTRACT

To test a print driver in a computer system, a driver-test data structure with associated applications and documents is automatically generated. The driver-test data structure is processed to open the associated applications and documents and thereby test the print driver. In one aspect of the invention, one or more print options associated with said driver are selected. The driver-test data structure is automatically generated with the associated applications, documents and print options. The driver-test data structure is processed to open the associated applications and documents, and to set the selected print options. In another aspect of the invention, the print options of a driver are automatically learned.

24 Claims, 11 Drawing Sheets

APPARATUS AND METHOD FOR AUTOMATED TESTING OF PRINT DRIVERS IN A COMPUTER SYSTEM

BRIEF DESCRIPTION OF THE INVENTION

This invention relates generally to testing computer systems. More particularly, this invention relates to a method and apparatus for testing print drivers in a computer system.

BACKGROUND OF THE INVENTION

Typically computer systems have a processor, memory, display, an input device and a printer. A computer program, called a print driver, is stored in the memory and is executed by the processor to communicate with the printer. When a new printer is attached to the computer system, typically a new print driver is also installed. Sometimes a new print driver is installed for an existing printer to fix software problems or enhance the printer's operation. Computer systems often store many different types of application programs that use the printer to print different types of documents. For example, the application programs may include a word processing program, a spreadsheet program and a drawing program.

The printing process under MICROSOFT WINDOWS™ (Registered Trademark of Microsoft Corporation) is as follows. The application translates the document to be printed into an intermediate representation with the aid of a MICROSOFT WINDOWS™ module called Graphics Device Interface (GDI). The GDI also displays graphics and text on a display. MICROSOFT WINDOWS™ instructs the print driver to translate the intermediate representation to the specific language of the printer, such as Hewlett-Packard's PCL™ (Registered Trademark of Hewlett Packard Company) and Adobe's POSTSCRIPT™ (Registered Trademark of Adobe Systems Inc.).

Printing a document tests and exercises a print driver because the driver translates from the intermediate representation to the language of the printer. The more varied the documents, the better the testing because more aspects of the print driver are tested. Using different types of applications and documents increases the likelihood that the print driver is tested properly.

When a print driver is changed or a new print driver is added, the system is tested to make sure the print driver operates properly. Traditionally, two techniques have been used to test print drivers—a manual technique and a partially automated technique. In the manual technique, the tester manually performs a series of steps to test the print driver. For example, the user opens an application, such as Microsoft WORD, and opens a document via Microsoft WORD. The user manually calls the print driver through Print Setup, sets options, such as orientation and paper size, and approves the options by hitting an OK or Apply button. The user instructs the application to print the document. The problem with the manual technique is that it is tedious, time-consuming and error-prone. Because users often forget the sequence of steps, if a problem arises, it is difficult to retrace the user's steps to identify the source of the problem.

In the partially automated technique, a programmer writes a test program that "hard codes" the names and behaviors of the applications, documents and drivers in the test program. When executed, the test program opens the application and document, sets the values of the driver options, prints the document, and closes the document and application. The problem with the partially automated technique is that adding new applications, drivers, or driver options may involve rewriting or modifying the test program. The test program is designed to test a set of specified applications using specified drivers with specified sets of options. However, the test program may not be able to test a print driver when new applications are added, when the operation of the specified driver has changed, or when options are added. In any of these cases, the test program must either be modified or rewritten. Although the test program can be designed using modular programming and common procedures to reduce the number and magnitude of modifications, the test program must still be at least modified.

In view of the foregoing, it would be desirable to provide a method and system to automatically test drivers. This method and system should allow applications, documents, drivers and driver options to be easily added, modified and deleted.

SUMMARY OF THE INVENTION

To test a print driver in a computer system, a driver-test data structure with associated applications and documents is automatically generated. The driver-test data structure is processed to open the associated applications and documents and thereby test the print driver.

In one aspect of the invention, one or more print options associated with the driver are selected. The driver-test data structure is automatically generated with the associated applications, documents and print options. The driver-test data structure is processed to open the associated applications and documents, and to set the selected print options. In an alternate aspect of the invention, the print options of the print driver are automatically learned.

In another aspect of the invention, a graphical interface is provided to associate the applications and documents. In yet another aspect of the invention, the graphical interface includes a spreadsheet to associate the applications and documents. In yet another aspect of the invention, a graphical interface is provided to associate the applications, documents and print options.

By automating print driver testing, this invention reduces the time for testing drivers. Using the present invention, new drivers, applications, documents and driver options can be easily added, modified and deleted for the automated testing.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
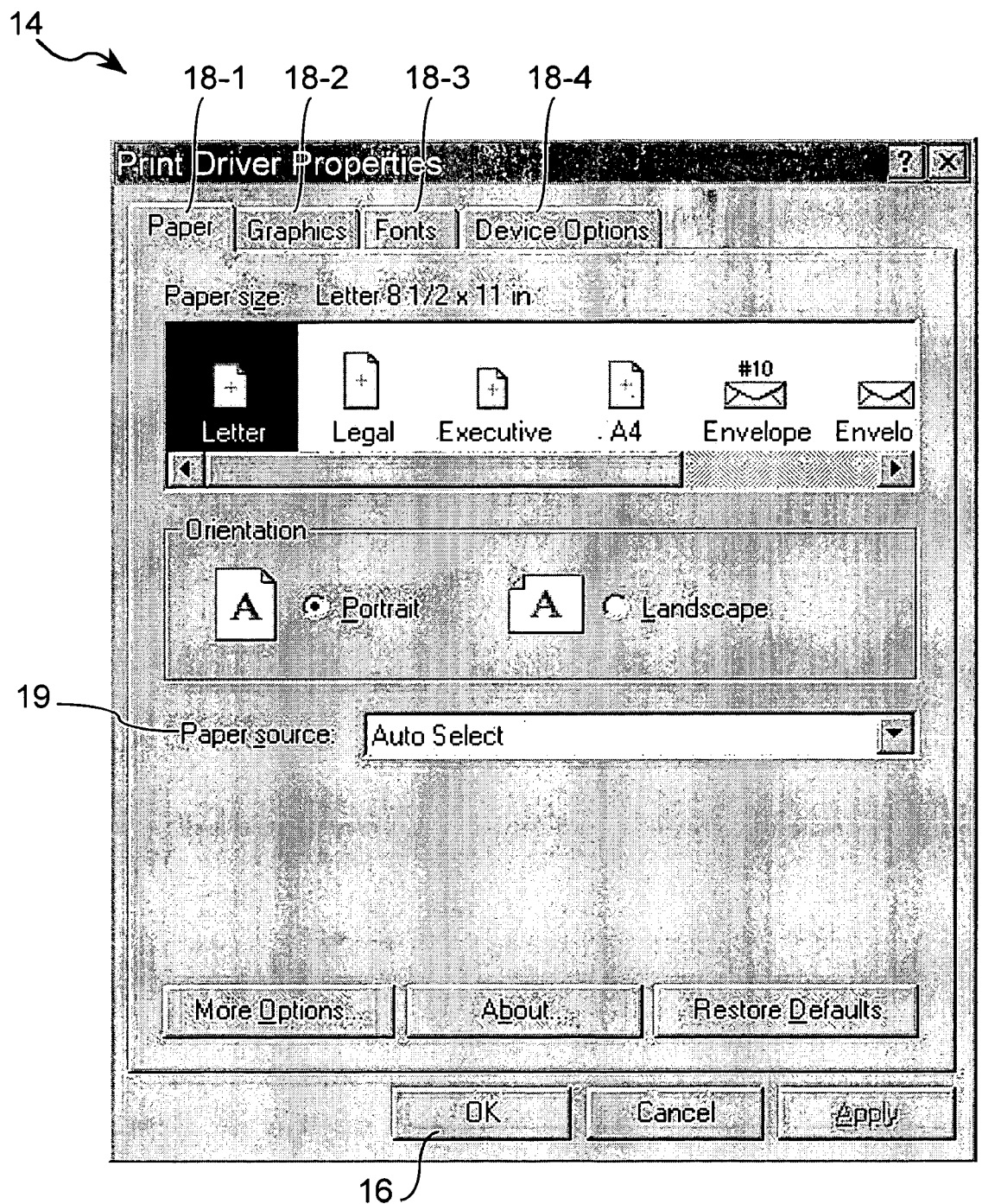
FIG. 1 illustrates an exemplary graphical user interface with control options of an exemplary print driver.

As shown in FIG. 1, a driver has numerous control options which can be set interactively using the driver's graphical user interface (GUI) 14. In the print driver GUI 14, print options are set using control objects. A control object is a predefined graphical object. For example, there are many different types of control objects including a button 16, a tab control 18 with its associated tabbed pages 18-1 to 18-4, and a combo box 19. In this description, control objects may also be referred to as controls.

The non-programmatic automated print driver tester automatically learns at least a subset of the control objects of the print driver. To test the print driver, the non-programmatic automated print driver tester automatically exercises the learned control objects. A control object is exercised by selecting a specified setting of the control object and then reading back that setting of the control object to be sure the control object has the specified setting.

Figure 2:
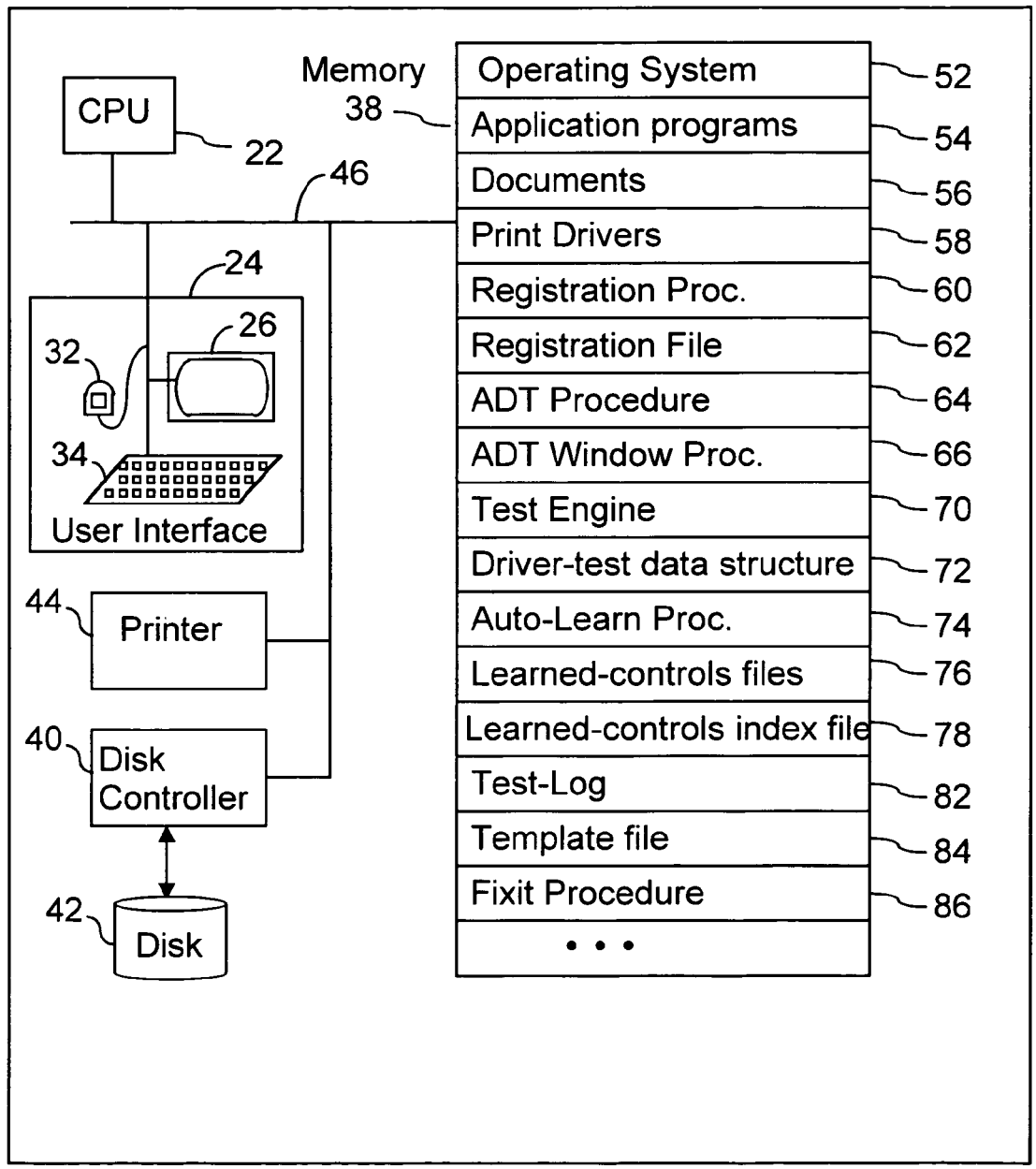
FIG. 2 illustrates a computer system implementing the non-programmatic automated print driver testing based on automatic learning of the driver under test and easy integration of applications.

In FIG. 2, a computer system 20 implements non-programmatic automated print driver testing in accordance with an embodiment of the present invention. The computer system 20 includes:

a data processor (CPU) 22;

a user interface 24, including a display 26, and one or more input devices, such as a mouse 32 and a keyboard 34;

a memory 38, which may include random access memory as well as disk storage and other storage media;

a disk controller 40 and disk drive 42 for retrieving information from and storing information to the disk drive 42; the information includes programs and data;

a printer 44 that prints documents; and one or more buses 46 for interconnecting the aforementioned elements of the computer system 20.

The memory 38 stores a number of different programs, sometimes called procedures. The print driver testing control programs are executed by the system's processor 22. In a typical implementation, the memory 38 includes:

an operating system 52 that includes procedures for handling various basic system services and for performing hardware dependent tasks; the operating system 52 may include a set of user interface procedures for handling input received from the user interface 24 and displaying the output to the user on the display 26;

one or more application programs 54;

one or more documents 56 to be displayed or printed by the applications 54; specific documents may be designated to be printed by specific applications;

one or more print drivers 58, invoked by the applications 54, that provide an interface between the applications 54 and the printer 44 to print a document 56; in a preferred implementation the print driver 58 provides a printer-driver graphical user interface to allow a user to set printer options; the printer-driver graphical user interface may include one or more windows; many windows may require a user response;

a registration procedure 60 that registers an application 54 for testing; the registration procedure 60 provides a graphical user interface for the user to enter registration information describing each application 54 that may be selected for testing; in one embodiment, the registration procedure 60 generates a registration file 62 that includes registration information for each registered application;

the registration file 62 that stores the registration information for the applications 54; in one implementation, the registration file 62 is called knownapp.txt;

an ADT procedure 64 that includes a set of procedures that implement the non-programmatic automated print driver testing in accordance with an embodiment of the present invention;

an ADT window procedure 66 that provides a graphical user interface to allow a user to select a driver to test, and that allows a user to select applications, documents and driver options;

a test engine 70 that opens associated applications and documents, and sets selected print options, if any, of a driver-test data structure to test the print driver;

a driver-test data structure 72, that in one implementation, is a spreadsheet file;

an auto-learn procedure 74 that identifies print driver options and stores the identified options in a learned-controls file 76; in particular, the auto-learn procedure 74 identifies the control objects of the graphical user interface of the print driver;

at least one learned-controls file 76 that stores the driver's controls; the name of the learned-controls file 76 is a numerical prefix followed by a ".fnd" extension;

a learned-controls index file 78, updated by the ADT procedure 64, that associates each learned driver with a learned-controls file 76 that identifies the driver's controls; the controls are those options that may be set by a user via the printer-driver graphical user interface; the learned-controls index file 78 has a ".fdt" extension; for example, the learned-controls index file 78 may have a name of "drivrnams.fdt;"

a test-log file 82, generated by the test-engine 70, that associates a date and time with specified events during testing; and a template file 84 that specifies application programs 54 and documents 56 to be tested, and not a print driver 58. A template file is used to easily create spreadsheets to test different print drivers 58 using the same application 54 programs and documents 56; and a fixit procedure 86 to allow the user to correct improperly identified controls of the print driver.

Figure 3:
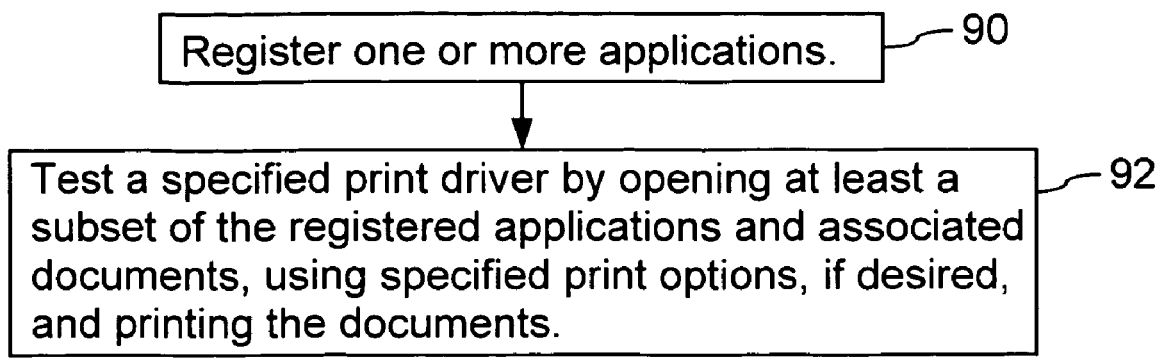
FIG. 3 is a flowchart of a method implementing the automatic testing of print drivers in accordance with an embodiment of the present invention.

In FIG. 3, an overview of the testing technique in accordance with an embodiment of the present invention is shown. In step 90, an application 54 (FIG. 2) is registered using the registration procedure 60 (FIG. 2). In one embodiment, the registration procedure 60 is implemented by a procedure called "Edit Known App" which will be described in detail with reference to FIGS. 4A and 4B. In step 92, the ADT procedure 64 (FIG. 2) invokes the test-engine 70 (FIG. 2) to open at least a subset of associated registered applications and documents, setting specified print options, if desired, of a driver-test data structure 72 (FIG. 2), and printing the document to test the print driver 58 (FIG. 2).

Figure 4A:
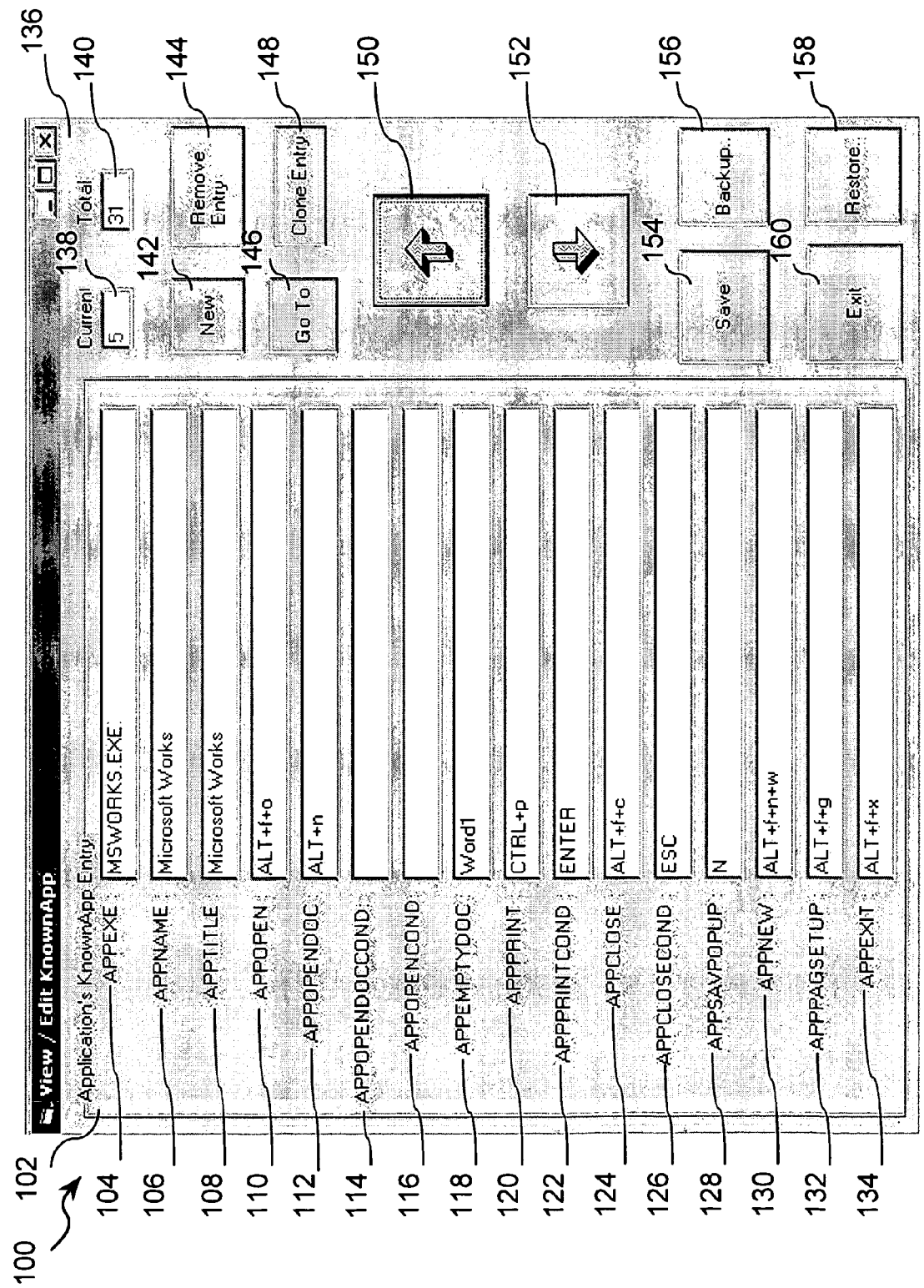
FIG. 4A illustrates a graphical user interface of a registration procedure in accordance with an embodiment of the present invention.

In FIG. 4A, a graphical user interface (GUI) 100 displayed by the registration procedure 60 (FIG. 2) is shown. When the registration procedure 60 (FIG. 2) is invoked, the registration procedure 60 (FIG. 2) presents the user with the GUI 100 in which to provide registration information about the applications. Each application 54 is a separate entry with data that is entered in an "Application's KnownApp Entry" area 102 of the GUI 100. The "Application's KnownApp Entry" area 102 includes a set of text fields 104–134, not all of which may be populated, that describe the application. For each entry, the text fields 104–134 are as follows:

APPEXE 104 is the name of the executable file of the application.

APPNAME 106 is the user's common name for the application.

APPTITLE 108 is the captioned name displayed on the title bar of the application.

APPOPEN 110 is a predetermined keystroke sequence to open a document or file in the application.

APPOPENDOC 112 is a predetermined keystroke sequence to place a cursor at a field where the document name is to be entered to open a new document in the application.

APPOPENDOCCOND 114 is a predetermined keystroke sequence to respond to a dialog box that may be presented on the display in response to the keystroke sequence of APPOPENDOC. Not all applications will display a dialog box when opening a document.

APPOPENCOND 116 is a predetermined keystroke sequence to respond to a dialog box that may be presented on the display when an application begins execution. Not all applications will display a dialog box when opening a document.

APPEMPTYDOC 118 is a default name given to a new document by the application.

APPPRINT 120 is a predetermined keystroke sequence that opens a print dialog box to print an open document in the application.

APPPRINTCOND 122 is a predetermined keystroke sequence that instructs the print dialog box to start printing the document.

APPCLOSE 124 is a predetermined keystroke sequence to close a document in the application.

APPCLOSECOND 126 is a predetermined keystroke sequence to respond to a dialog box that may be presented on the display in response to closing the document. Not all applications will display a dialog box when closing a document.

APPSAVPOPUP 128 is a predetermined keystroke sequence to respond negatively to a dialog box that may be presented on the display when closing a document asking if the document is to be saved.

APPNEW 130 is a predetermined keystroke sequence to respond to a dialog box that may be presented when a new document is created.

APPPAGSETUP 132 is a predetermined keystroke sequence to display a page set-up window in the application to control the appearance of the document.

APPEXIT 134 is a predetermined keystroke sequence to exit the application.

Some applications display a sequence of pop-up windows in response to certain commands. To provide predefined responses to these pop-up windows, each text field 104–134 can store multiple keystroke sequences. To form a string of keystroke sequences, multiple keystroke sequences are entered in a text field separated by semi-colons. Each keystroke sequence is terminated by a semi-colon and is a response to a particular pop-up window.

In FIG. 4A, an exemplary set of registration information for an application known as MICROSOFT WORKS is shown. The plus sign "+" is a visual representation indicating a key combination, but the plus sign is not stored internally. The alternate (ALT), control (CNTL) and escape (ESC) characters are combined with the next alpha-numeric character. For instance, "Alt+f+o" means that the keys for the Alt and f keys are combined and played, followed by the key for the "o" character. Internally, the ADT procedure stores a string representing the "Alt+f+o" key sequence as follows:

{ALT}(f)o.

In a preferred embodiment, the entry fields 104–134 of the "Edit KnownApp" window 100 are read only, and the user double clicks on the desired entry field to pop-up a window that allows the user to add, change and delete text for that entry field. In an alternate embodiment, the entry fields 104–134 of the "Edit KnownApp" window 100 can also be written to, so that the user can manually add, change and delete the text in the entry fields.

In an entry control area 136 of the registration window 100, the number of the current entry is displayed in a current entry field 138 and the total number of entries is displayed in a total entry field 140. A new button 142 is used to add a new entry. A remove entry button 144 is used to delete an entry. A "Go To" button 146 provides a shorthand way of navigating to different entries. A clone entry button 148 creates a new entry with the same registration information as the current displayed entry. The Up and Down arrow buttons, 150 and 152, display a previous or next entry, respectively. A save button 154 saves the registration information in the registration file 62 (FIG. 2). The registration information of the text fields of the Application's KnownApp Entry area 102 for each application is stored in the registration file 62 (FIG. 2). The backup and restore buttons, 156 and 158, are used to backup and restore registration information, respectively. The exit button 160 closes the registration window 100 (FIG. 2) and terminates the registration procedure 60 (FIG. 2).

Figure 4B:
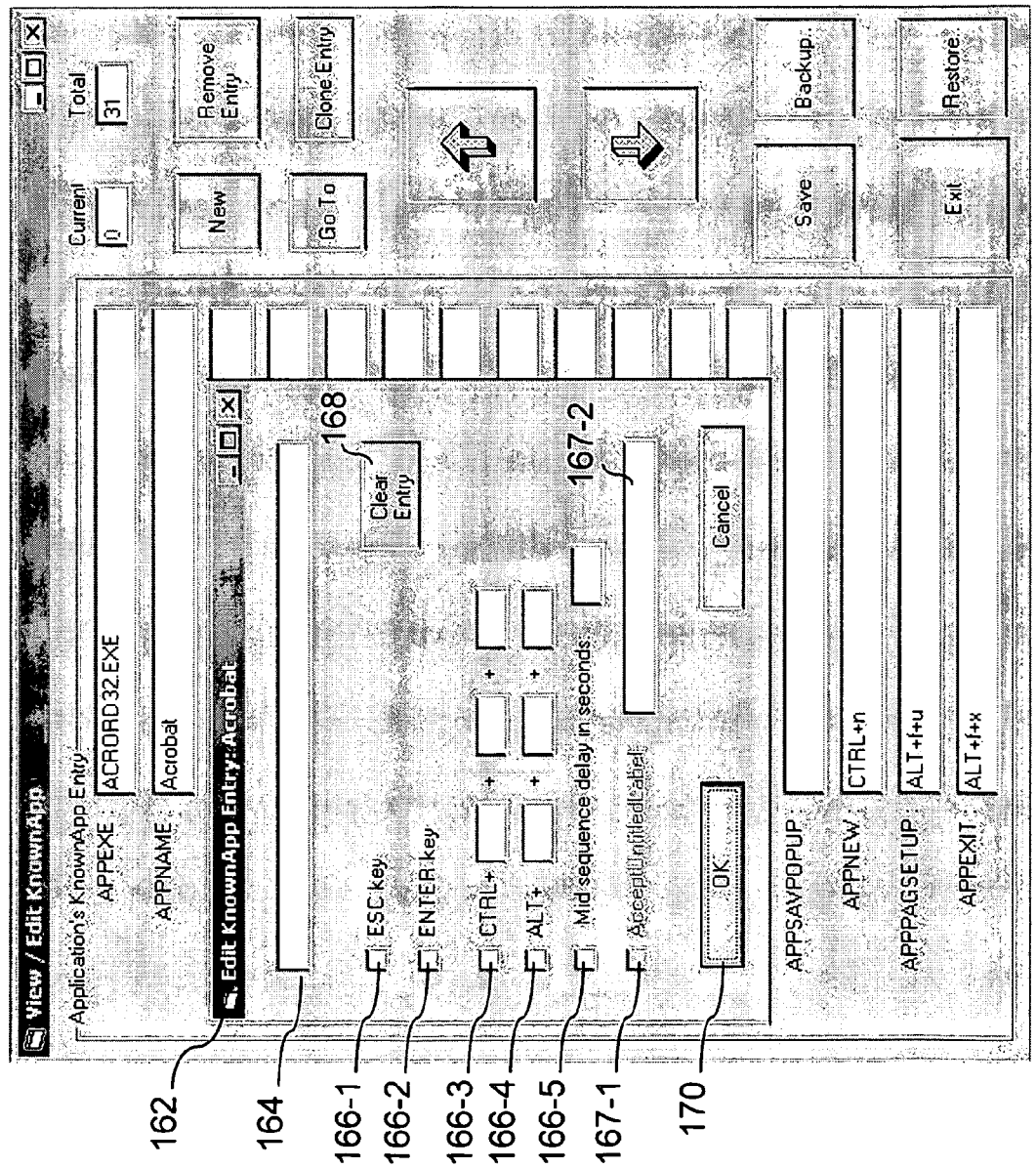
FIG. 4B illustrates an exemplary pop-up window to configure one or more keystroke characters in an entry field of FIG. 4A in the registration procedure.

In FIG. 4B, to update an entry field 104–134 of the "Edit KnownApp" window 100 (FIG. 4A), the user double clicks on the desired entry field and an "Edit KnownApp Entry" pop-up window 162 is displayed. The "Edit KnownApp Entry" pop-up window 162 provides a text field 164 for displaying the entered key sequences. A set of checkboxes 166 allow the user to specify predefined key sequences. When checked, check box 166-1 places the keystroke for the escape (ESC) key in the entry field. When checked, check box 166-2 places the keystroke for the enter (ENTER) key in the entry field. When checked, check box 166-3 places a set of keystrokes for the combination of the control (CTRL) key and a specified key, followed by up to two additional keys in the entry field. When checked, check box 166-4 places a set of keystrokes for the combination of the alternate (ALT) key and a specified key, followed by up to two additional keys in the entry field. When checked, check box 166-5 allows a user to specify a delay between keystroke sequences in seconds. When the "AcceptUntitledLabel"

checkbox 167-1 is checked, the "AcceptUntitledLabel" text box 167-2 can be populated. The "AcceptUntitledLabel" checkbox 167-1 and text box 167-2 are used when an application displays a predefined generic name when opening a document, rather than the actual name of the document. For example, when some applications open a document designated as read-only, those applications open a copy of the document with a generic name such as "untitled-1." The generic name is entered into the "AcceptUntitledLabel" text box 167-2. When opening a document, the test-engine uses the generic name rather than the actual name of the document to confirm that the correct document was opened. A clear entry button 168 clears the current entry field being edited. An "OK" button 170 updates the specified entry field with the entered key sequence. Based on the selected checkboxes 166 and 167-1, the registration procedure generates and stores the appropriate keystroke sequence to be played. In this way, by using checkboxes 166 rather than directly typing keystrokes, the user can specify complex keystroke sequences and the number of errors from entering incorrect sequences is reduced.

Figure 5:
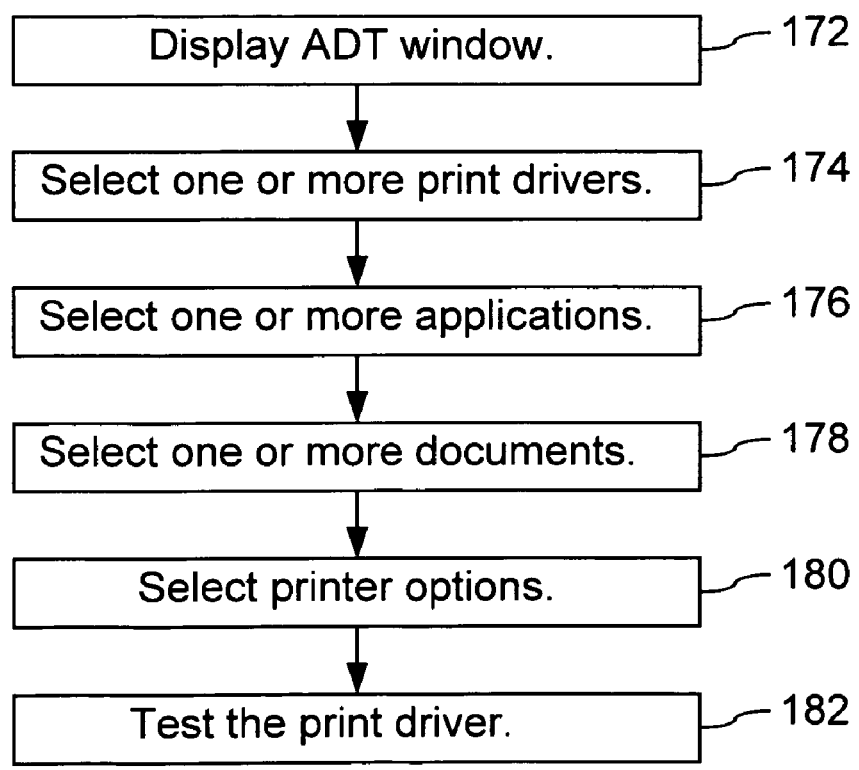
FIG. 5 is more detailed flowchart of a method of testing a specified print driver of FIG. 3.

Referring to FIG. 5, a flowchart of operating the ADT procedure 64 (FIG. 2) to test a print driver is shown. Once at least one application has been registered in the registration file 62 (FIG. 2), the ADT procedure 64 (FIG. 2) can be invoked to test a print driver 58 (FIG. 2). In step 172, the ADT procedure 64 (FIG. 2) invokes the ADT window procedure 66 (FIG. 2) to display an ADT window, which will be described in detail with reference to FIGS. 6 and 7. In step 174, a print driver is selected. In step 176, one or more applications are selected. In step 178, one or more documents are selected. The user associates subsets of the documents with each selected application. In step 180, printer options are selected and modified, if desired. In step 182, from the ADT window, the user invokes the test-engine 70 (FIG. 2) to test the selected print driver using the selected applications, documents, and printer options.

Figure 6:
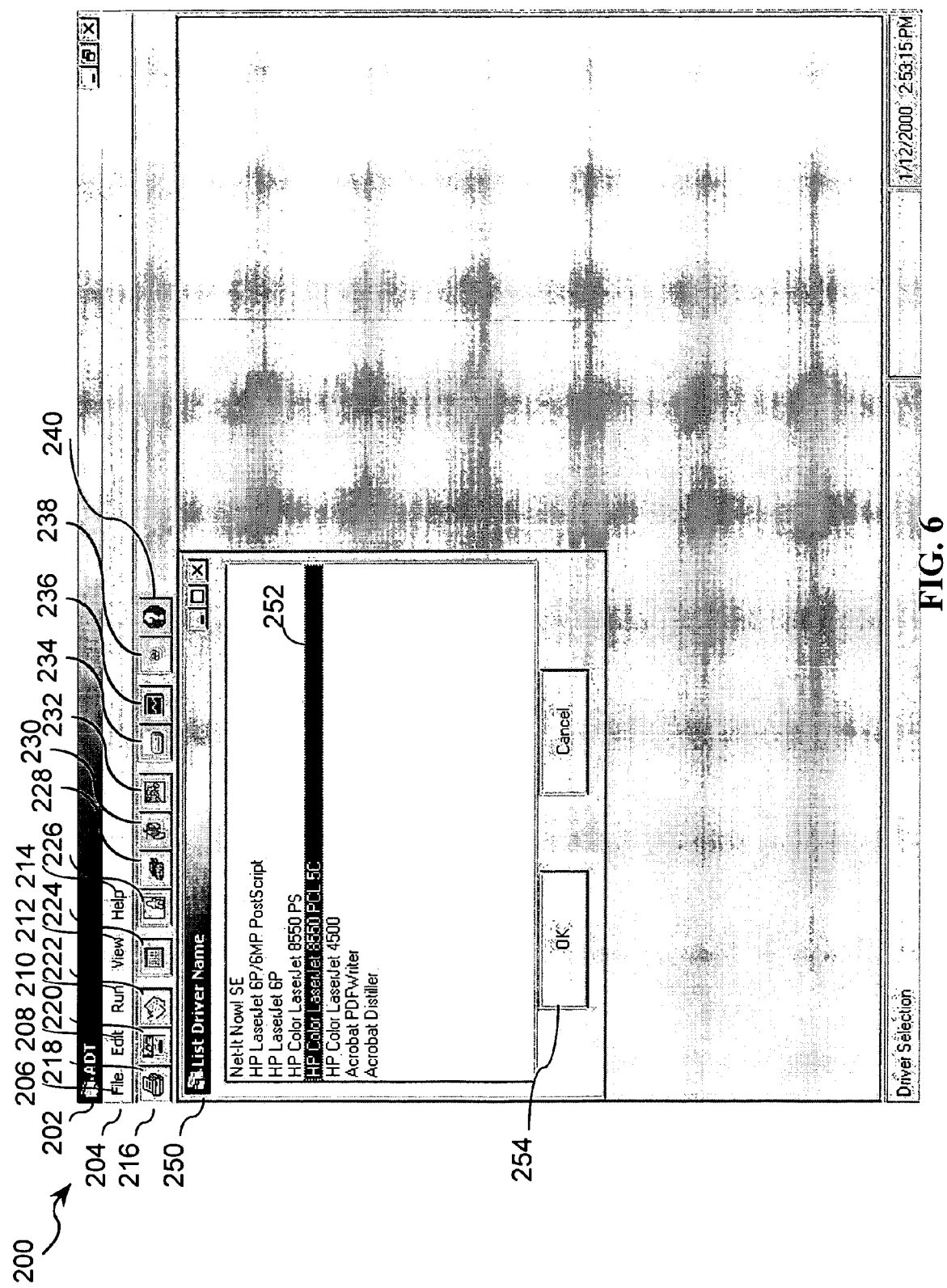
FIG. 6 illustrates selecting a print driver of an Automated Driver Testing (ADT) procedure in accordance with an embodiment of the present invention.

In FIG. 6, in a noteworthy aspect of the invention, a graphical interface is provided to select the print driver. The graphical interface is an ADT window 200, generated by the ADT window procedure 66 (FIG. 2). A title bar 202 of the ADT window displays "ADT" to identify the non-programmatic automated print driver test. A menu bar 204 provides well-known command buttons including "File" 206, "Edit" 208, "Run" 210, "View" 212 and "Help" 214. A tool bar 216, below the menu bar 204, provides additional command buttons including: "Select driver" 218, "Open application" 220, "Open multiple documents" 222, "Create spreadsheet" 224, "Run" 226, "Auto-learn" 228, "Manual learn" 230, "Fix-it" 232, "Call driver" 234, "View log" 236, "Edit associate file" 238 and "Help" 240.

Figure 7:
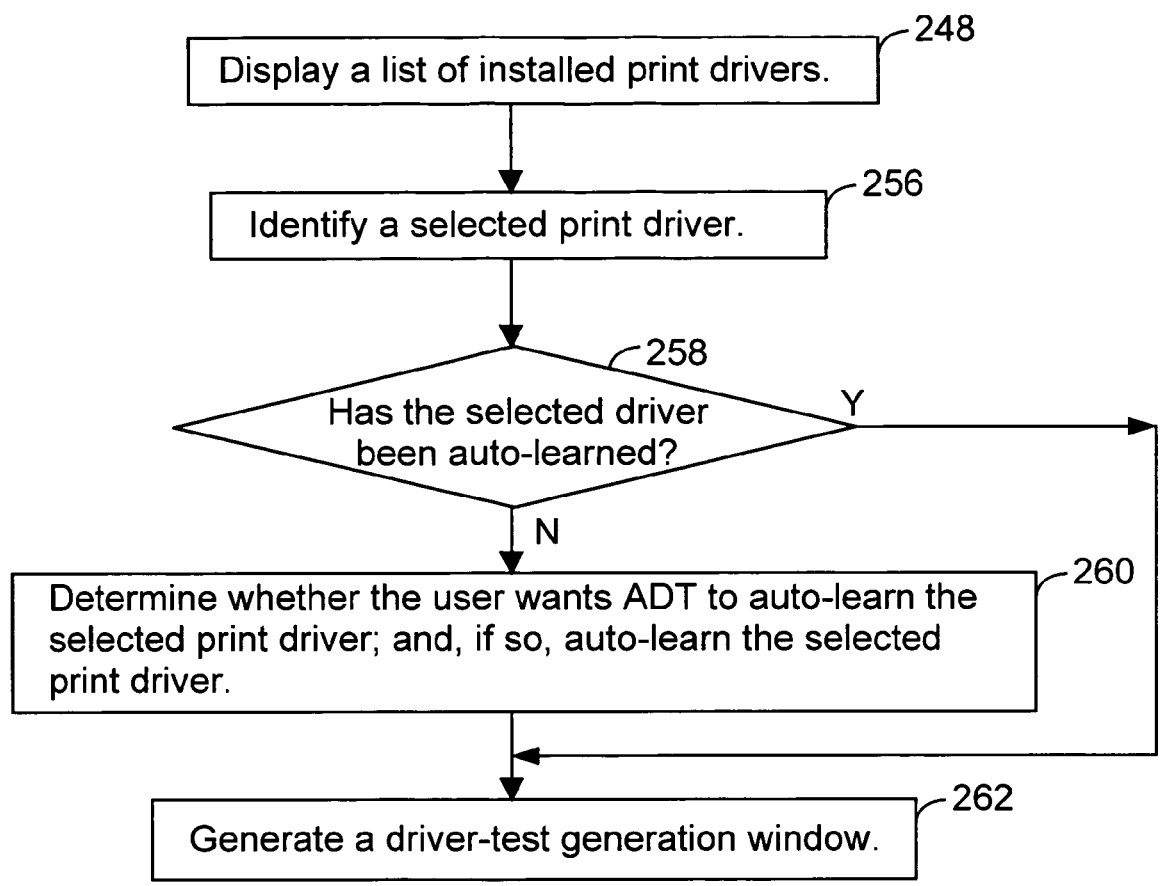
FIG. 7 is a flowchart of a method of selecting a driver to be tested using the graphical user interface of FIG. 6.

Referring also to the flowchart of FIG. 7, when the user activates the "Select Driver" button 218, in step 248, the ADT window procedure 66 (FIG. 2) displays a "List Driver Name" window 250 which lists the installed print drivers of the computer system. The user selects an installed print driver 252 for testing, and activates the "OK" button 254. In step 256, the ADT window procedure 66 (FIG. 2) identifies a selected print driver. In step 258, the ADT window procedure 66 (FIG. 2) checks the learned-controls index file 78 (FIG. 2) to determine whether the selected print driver 252 has already been auto-learned by the auto-learn procedure 74 (FIG. 2). If the selected print driver 252 has already been auto-learned, the name, as it appeared in the "List Driver Name" window 250, will be found in the learned-controls index file 78 (FIG. 2).

If the selected print driver has not been auto-learned, the name of the selected print driver is not in the learned-controls index file 78 (FIG. 2). In step 260, the ADT window procedure 66 (FIG. 2) provides a pop-up auto-learn window that asks the user if they want ADT to auto-learn the print driver. If the user selects a "Yes" button, the ADT window procedure invokes the auto-learn procedure 74 (FIG. 2) which generates the learned-controls file 76 (FIG. 2) for the driver, and updates the learned-controls index file 78 (FIG. 2) with the driver name and the name of the learned-controls file for that driver. In step 262, the ADT window procedure 66 (FIG. 2) generates a display similar to FIG. 8 except that the body of a spreadsheet is empty, excluding the first three rows. If the user selects a "No" button, the ADT window procedure does not update the learned-controls file 76 (FIG. 2) and learned-controls index file 78 (FIG. 2), and proceeds to generate a display as shown in FIG. 8, except that no driver or control options are shown.

Figure 8:
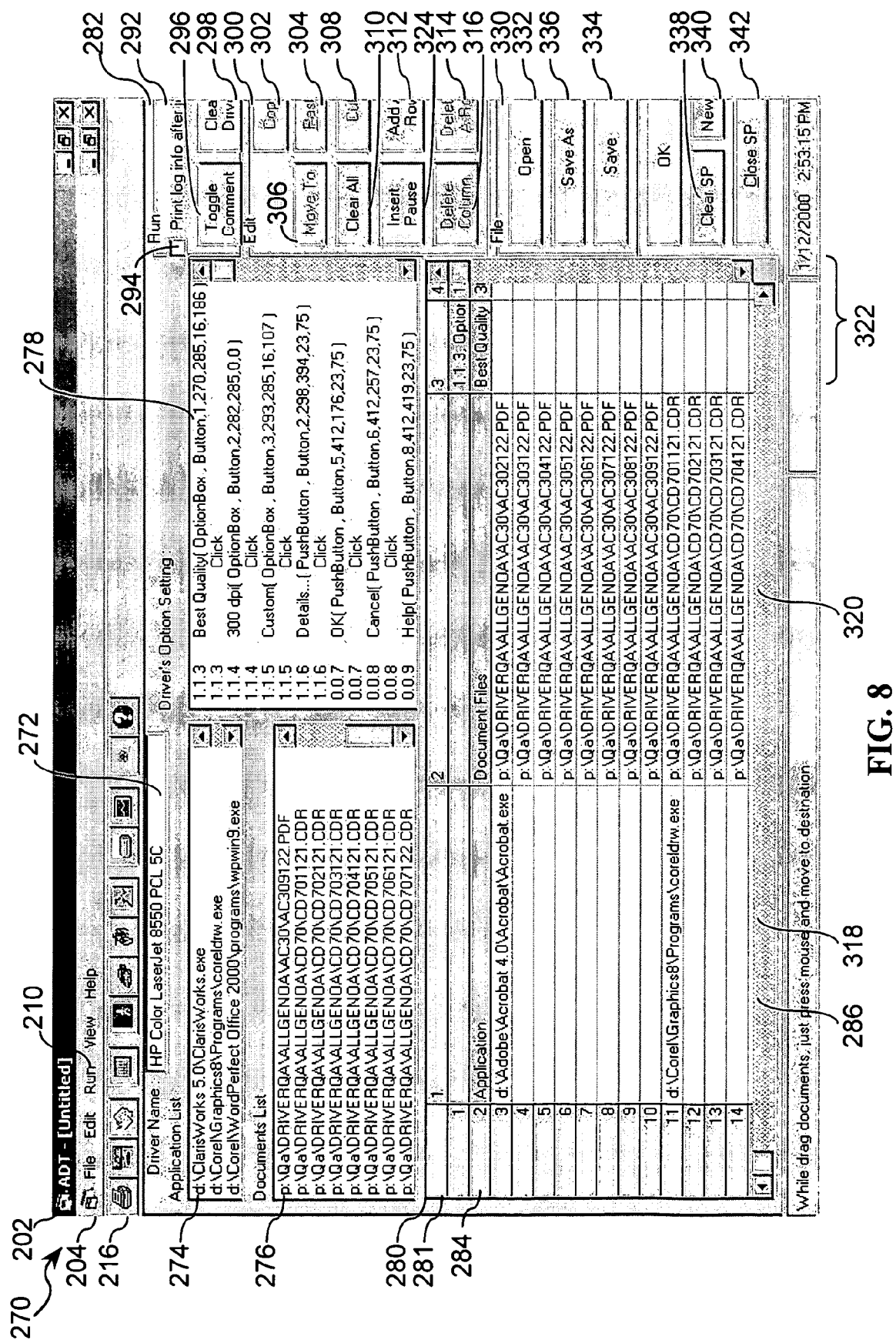
FIG. 8 illustrates an update panel of the graphical user interface of the ADT procedure which provides a graphical user interface to implement the flowchart of FIG. 5.

Referring to FIG. 8, after a print driver has been selected, the ADT window procedure 66 (FIG. 2) displays an update panel 270 which provides a graphical user interface to implement the flowchart of FIG. 5. The title 202, menu bar 204 and tool bar 216 are the same as in FIG. 6. The ADT window procedure 66 (FIG. 2) displays the name of the selected driver in a driver name text box 272 in the update panel 270. An application list area 274 displays a scrolling list of names of application programs 54 (FIG. 2) that were registered by the registration procedure 60 (FIG. 2). Alternately, when the user clicks on the "Open Application" 220 menu button, the ADT window procedure displays a pop-up window that allows a user to select applications to add to the scrolling list of the application list area 274. Once these applications are added to the list, they are stored so the user need not repeat that addition again until there are new applications to add to the list.

A documents list area 276 displays a scrolling list of document names using the full-path name. The ADT window procedure identifies documents by allowing the user to add selected documents to the scrolling list of the documents list area 276 by clicking the open documents button 222. When the user clicks on the open documents menu button 222, the ADT window procedure displays a pop-up window that allows a user to select documents to add to the scrolling list of the documents list area 276. After the documents are displayed, the documents can be used to create a new spreadsheet for a learned or for a not-yet-learned driver, or to update an older spreadsheet. A driver's option setting area 278 displays a scrolling list of learned-controls for the selected print driver from the learned-controls file 76 for the selected driver. Each learned control includes a controlID, a control type, the control's class name, the control's ordinal number, the control's relative location with respect to the top left corner of the driver control window, the height and width of the control, and one or more selectable control values for that control.

In another noteworthy aspect of the present invention, a spreadsheet area 280 displays a spreadsheet 281 which allows a user to easily associate applications and documents, and to control the printer options for each combination of application and document, if desired. The user may create a new spreadsheet. Alternately, the user may select an existing spreadsheet.

A control area 282 has buttons to help the user to build a spreadsheet which will control the driver and the application. The control area 282 will be described in further detail below. Initially, the spreadsheet area 280 is empty, except for the first three rows which list print driver options if a print driver has been specified. As shown in FIG. 8, the spreadsheet area 280 displays a spreadsheet which has been populated.

The spreadsheet has cells which are organized in rows and columns, 284 and 286, respectively. Columns one and two of the spreadsheet store predefined types of data. Column one stores the names of the applications and column two stores the names of documents. The third row of the spreadsheet displays the captions for the columns. The caption for column one is "Application," and the caption for column two is "Document Files." The captions for each control are shown in column three to the last column. The captions for the controls are from the learned-controls file 76 (FIG. 2).

The user uses the mouse to populate the spreadsheet. To select applications to test, the user uses the mouse to drag and drop the name of an application from the application list area 274 anywhere in one row of the spreadsheet area 280. The ADT procedure automatically places the name of the application in the first column. To select documents to test, the user uses the mouse to drag and drop the name of one or more documents from the documents list area 276 into a row. The ADT procedure automatically drops the document name in that row. Subsequent documents are dropped in consecutive rows. The ADT procedure automatically places document names in column two.

To select print driver options, the user drags and drops the value of a control from the driver's option setting area 278 into a row. The ADT procedure automatically finds the column associated with that control, and drops that value in that associated column of the row. Alternately, to select values for the driver options, the user double clicks on the cell, the ADT procedure displays an options window which will be described below, and the user selects a value for the driver option. In addition, the user can globally search and replace in the cells. When all the selected documents in a spreadsheet are the same, but the paths have changed, the user can globally change the paths to eliminate the need for the user to manually enter data. For example, sometimes print drivers need to be tested with different sizes of paper. Using the spreadsheet, the user can globally change the paper size in the entire spreadsheet, such as changing a paper size of A4 to Legal size.

In the control area 282, additional controls increase the ease of creating, modifying and saving spreadsheets. A run area 292 includes a print log check box 294, a toggle comment button 296, and a clear driver button 298. When the print log check box 294 is checked, the ADT procedure 64 (FIG. 2) prints a portion of the test-log associated with that document after the document is printed. The toggle comment button 296 allows a user to selectively exclude a row from being executed by the test-engine 70 (FIG. 2). When a row is excluded, an exclusion symbol is placed at the beginning of the row. When the row is included, no exclusion symbol is present. The clear driver button 298 removes the print driver from the update panel 270 leaving all other information except print driver options. The clear driver button 298 facilitates the selection of a new print driver, and applying the new print driver to existing applications and documents in the spreadsheet area. The clear driver button 298 also aids in the creation of templates.

In an edit area 300 of the control area 282, another set of buttons, 302–316 and 324, allow a user to edit the spreadsheet. To perform copy and paste operations, a copy button 302 allows a user to copy selected items from list areas 274, 276 and 278, or the contents of selected cells of the spreadsheet; and, a paste button 304 allows the user to paste the contents of any copied information to a portion of the spreadsheet. In the case of selections from the driver's option setting area 278, the ADT procedure 64 (FIG. 2) copies the values of the print options. When pasted, the ADT procedure 64 (FIG. 2) places the copied values in the appropriate columns of the current row in the spreadsheet. A move button 306 allows the user to move selected cells of the spreadsheet. A cut button 308 allows the user to delete selected text from the spreadsheet. A clear all button 310 clears the entire update panel 270. An add a row button 312 adds an empty row to the spreadsheet, and a delete a row button 314 deletes the current row from the spreadsheet. A delete column button 316 deletes the column from the spreadsheet. Application and document columns, 318 and 320, respectively, cannot be deleted. Control options columns 322 can be deleted. An insert pause button 324 inserts a pause command into the spreadsheet. When the test-engine 70 (FIG. 2) recognizes the pause command, the test-engine 70 (FIG. 2) stops execution until the user instructs the test-engine to proceed.

In a file area 330 of the control area 282, another set of buttons allows a user to manage spreadsheet files. An open button 332 opens a previously created spreadsheet using its spreadsheet name. A save button 334 saves the current spreadsheet. A save as button 336 saves the current spreadsheet under a different specified name. A clear SP button 338 clears the spreadsheet area 280 except for the first three rows of the spreadsheet. A new SP button 340 creates a new spreadsheet with an "untitled" title. A close SP button 342 allows the user to close the entire update panel 270.

Figure 9:
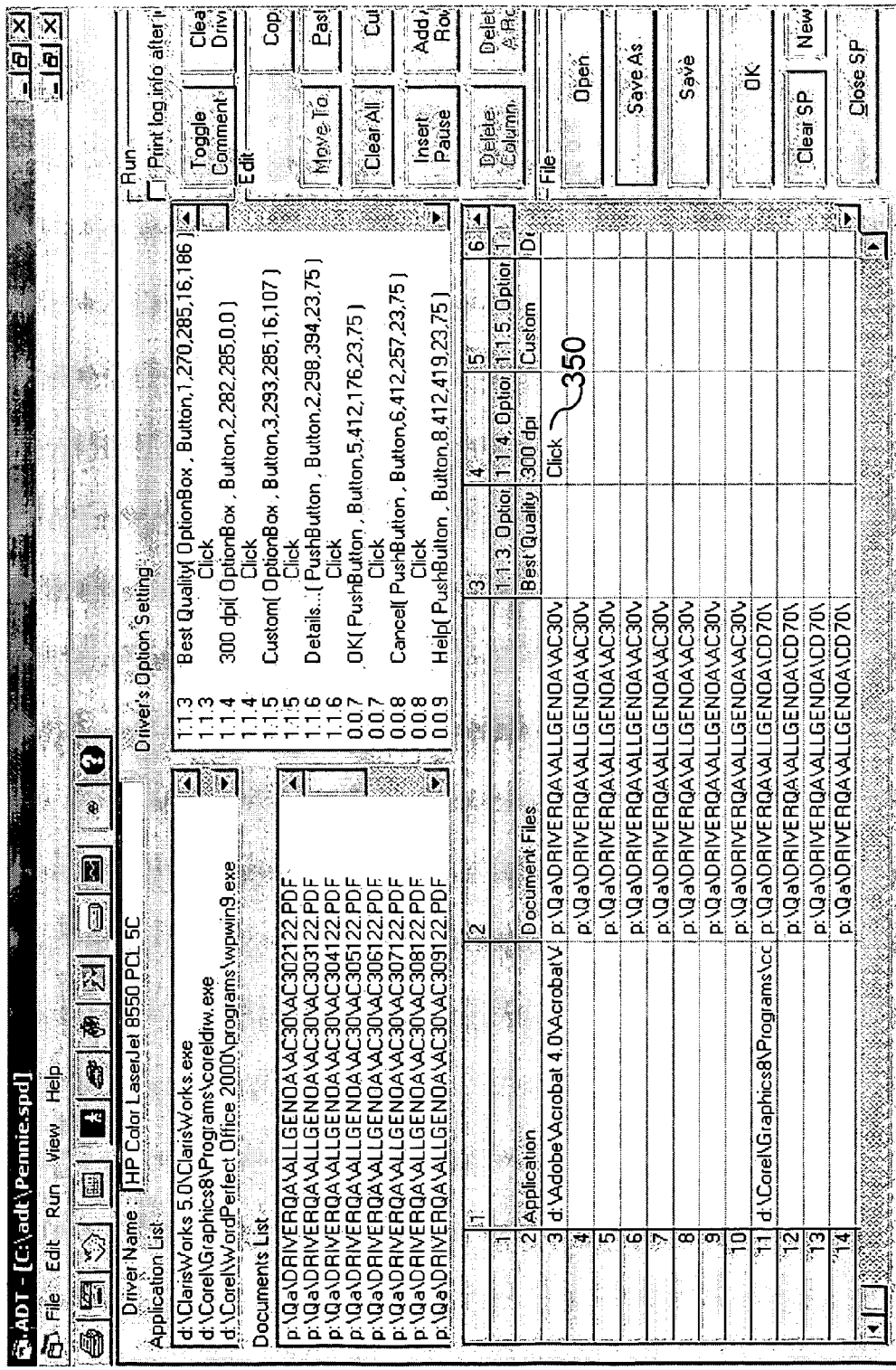
FIG. 9 illustrates another control option of the spreadsheet of FIG. 8.

FIG. 9 shows additional control options using the same spreadsheet of FIG. 8. For example, in row three, for that combination of application and document, the control option of the 300 dpi print option is set to click 350.

Figure 10:
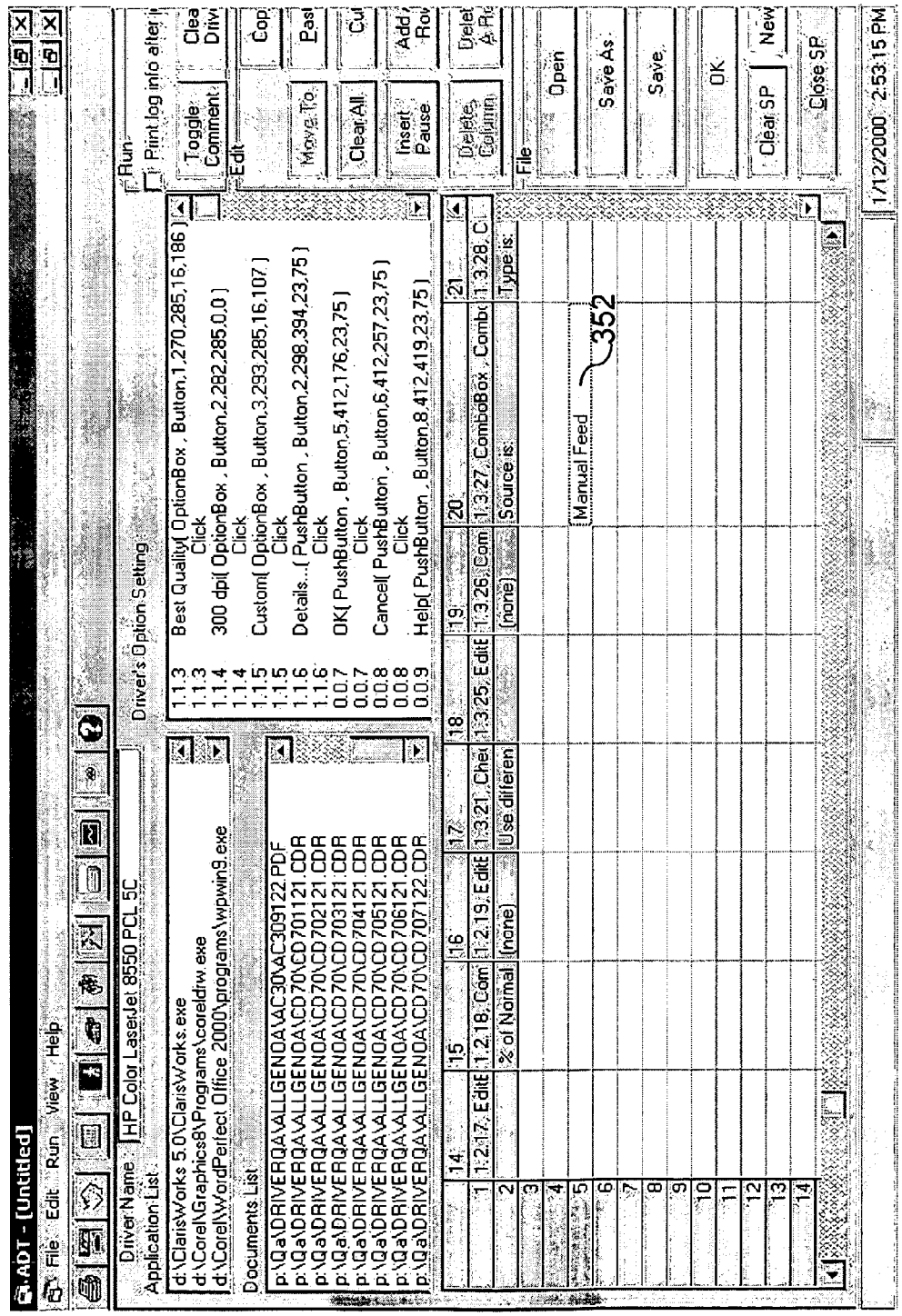
FIG. 10 illustrates yet another control option of the spreadsheet of FIG. 8.

FIG. 10 shows another control option of the spreadsheet of FIG. 8. For example in row five, the paper source is set to manual feed 352.

When the save or save as buttons are selected, the ADT procedure saves the contents of the spreadsheet in a driver-test data structure having a predefined format. The driver-test data structure includes all the specifications that the user has selected using the ADT window. In one implementation, the driver-test data structure is a spreadsheet file. The spreadsheet file is a tab separated text file and has a ".spd" extension, and will be discussed in further detail below.

Once the spreadsheet is updated, the test-engine 70 (FIG. 2) can be executed to test the specified print driver in accordance with the specifications of the spreadsheet. To invoke the test-engine, the user selects the run menu button 210 in the menu bar 204 or the run button 226 in the tool bar 216. In response, the test-engine 70 (FIG. 2) processes the driver-test data structure to open the associated applications and documents, set any printer options, and thereby test the print driver.

The test-engine 70 (FIG. 2) opens the driver-test data structure and processes the information row-by-row. Starting at column one, the test-engine 70 (FIG. 2) parses the row. If a new application is specified, the test-engine 70 (FIG. 2) closes the previous application and opens the new application, otherwise the test-engine 70 (FIG. 2) uses the previous application. When an application is executing, an application window is displayed. To determine whether the application window is displayed, the test-engine 70 (FIG. 2) issues commands to retrieve a handle of the application window that is currently the active window. The test-engine 70 (FIG. 2) determines the state of the application and the application's associated window. In a first state, the application may not be executing. In a second state, the application may be the top most window with no pop-up windows being displayed or special conditions needing a response. In a third state, the application may be the top most window with a pop-up dialog box associated with that application (a child dialog box) being displayed. In a fourth state, the application may be executing but may not be the top most window, and is hidden by other application windows. In particular, another application may display a pop-up window and place the cursor in that window. For example, a dialog box notifying the user of an email message may be displayed while the application that the test-engine launched is being executed. This new application has superceded the application launched by the test-engine in the list of processes in the operating system.

These states are identified using process handles, executable names and the application's own title in a succession of inquiries to the operating system. Often, an application has not finished loading and the ADT procedure waits for a predetermined amount of time for the loading to complete. The title of the application is in the application's registration entry item APPTITLE 108 (FIG. 4). Once the application is loaded, to confirm the identity of the application, the test-engine 70 (FIG. 2) retrieves the name of the application from it's title and compares it to the name entered in the APPTITLE entry item of the registration file.

For the state in which the application is on top and there are no pop-up windows, the test-engine 70 (FIG. 2) opens the document.

For the state in which the application is on top and there is a pop-up dialog window, the test-engine 70 (FIG. 2) dismisses that dialog box using the user supplied key sequence that is associated with that condition, in the APPOPENCOND field of the registration file. If the pop-up window is not dismissed after playing the user supplied key sequence, the test-engine 70 (FIG. 2) takes a guess as to the appropriate key sequence. The guess depends on a state of the test-engine. When opening applications and documents, or if printing, the test-engine selects the default choices of the dialog box by playing an enter key character. Alternately, when the enter key fails to dismiss the dialog box, the ADT procedure may execute an algorithm to dismiss the dialog box.

For the state in which the application is hidden behind a window of another application, the test-engine 70 (FIG. 2) attempts to bring the application window of the application launched by the test-engine to the top (foreground) and make it the active window. Using a loop, the test-engine waits for a predetermined amount of time for the application window of the application launched by the test-engine to return to the top. After the predetermined amount of time, if the application window of the application launched by the test-engine does not return to the top, then either the application has a software problem, the operating system failed because of resource shortages, the application was not installed properly, or another failure has occurred. The test-engine 70 (FIG. 2) stops execution of the rows associated with this application, and updates the log file to indicate that the rows associated with this application will not be processed. The test-engine begins processing the rows associated with a different application.

Once the application has displayed its application window that allows the user to select a document, the test-engine 70 (FIG. 2) opens the document specified in column two in the current row of the spreadsheet using the key sequence specified in the APPOPEN text field 110 (FIG. 4) of the registration file for the application. The APPOPENDOC field 112 (FIG. 4) in the registration file for the application ensures that the name of the document is in the correct place in an "Open file" dialog box. When the "Open file" dialog box is approved for a document and the document is being opened, if a pop-up window interferes with that document's opening, the test-engine accesses the user supplied information in the APPOPENDOCCOND field 114 (FIG. 4) in the registration file to determine the responsive keystroke sequence, if any. If there is no keystroke sequence or if the keystroke sequence fails to dismiss the interfering dialog box, the test-engine proceed to guess, as described above.

The test-engine 70 (FIG. 2) then determines whether any print driver options are specified in the row. If so, the test-engine 70 (FIG. 2) activates the print driver, which displays a print driver window. The test-engine 70 (FIG. 2) sets and responds to the controls of the print driver window as specified in the option setup window for that control. To ensure that the specified print driver options are set appropriately, the test-engine 70 (FIG. 2) determines whether the print option that the test-engine just set has been recorded in the print driver by querying the control for that print option for the current value of the print option. If the current value of the control for the print option does not match the specified value from the spreadsheet, the setting of that print option failed, and the test-engine records a message that identifies the failure to set that option in the test-log file. For example, the test-engine 70 (FIG. 2) writes the following in the test-log 82 (FIG. 2.): "Failure could not set specified option value . . . " with the date and time. The test-engine also prints the document so that the user may visually observe the failure. The combination of the test-log and the printed document helps engineering fix the print driver. Sometimes, the print driver indicates that a print option is set, but, the printed document demonstrates otherwise. In this case, the user can identify the failure by visually inspecting the printed document.

The print driver window is activated once for each row. Once all the options are set, the test-engine 70 (FIG. 2) automatically approves the print driver options by sending the keystroke sequence that effectively clicks the OK button, and dismisses the print driver window. The document is then printed by the test-engine 70 by exercising the key sequence in the APPPRINT field 120 (FIG. 4) of the registration file which invokes the application's own dialog box for printing. Because each such dialog box may be different for each application, and all such dialog boxes cannot be learned by the ADT procedure, the test-engine retrieves and exercises the key sequence, if any, specified in the APPPRINTCOND 122 (FIG. 4) field of the registration file to automatically respond to the application's dialog box for printing to approve the printing process. Typically, the key sequence for the APPPRINTCOND 122 (FIG. 4) field is the ENTER key. The typical application print dialog box has the OK button highlighted as a default selection, and exercising the ENTER key approves the printing of the document. When finished with all or selected rows, the test-engine simply displays the term "Done" in a message box.

Once created, a spreadsheet can be used many times. If the driver is modified, the user can request that the auto-learn procedure be executed to update the learned-controls file for that driver. In one embodiment, the user selects the auto-learn button 228 (FIG. 6) to invoke the auto-learn procedure 74 (FIG. 2).

Alternately, the ADT procedure provides a way for a user to test a subset of the applications, documents and selected controls in a portion of the spreadsheet. When a user highlights a subset of rows in the spreadsheet, the test-engine 70 (FIG. 2) processes a portion of the driver test data structure associated with the highlighted rows, and thereby tests the print driver with the applications, documents, and selected controls of only the highlighted rows.

For those controls that are clicked or unclicked, such as radio buttons, push buttons and checkboxes, the ADT procedure visually represents available state(s) of those controls to the user using values of "Click", "On" and "Off." When the ADT procedure presents "Click" to the user and the user selects "Click" for the value, the ADT procedure will apply a left-mouse button click to that control. For check boxes, the "Click" value toggles the check box between opposite values. If the check box includes a check mark, the "Click" will remove the check mark; if the check box is empty, the "Click" will place a check mark in the check box. For radio buttons, in general, the "Click" value selects a radio button, but does not unselect an already selected radio button. The "On" and "Off" values allow the user to set a check box to a specific value. This is often better for check boxes because it ensures that the driver option is either set or not set. A "Click" is allowed but not recommended for check boxes. For radio buttons and pushbuttons, the "On" and "Off" values do not apply, and are not presented as an available value to the user.

In this way, the present invention, automated driver testing (ADT), makes it easy to add, modify and delete, drivers, applications, documents, and driver options to be tested. It also makes it easy to expand the number and nature of the options to be tested.

Selecting Options

Figure 11:
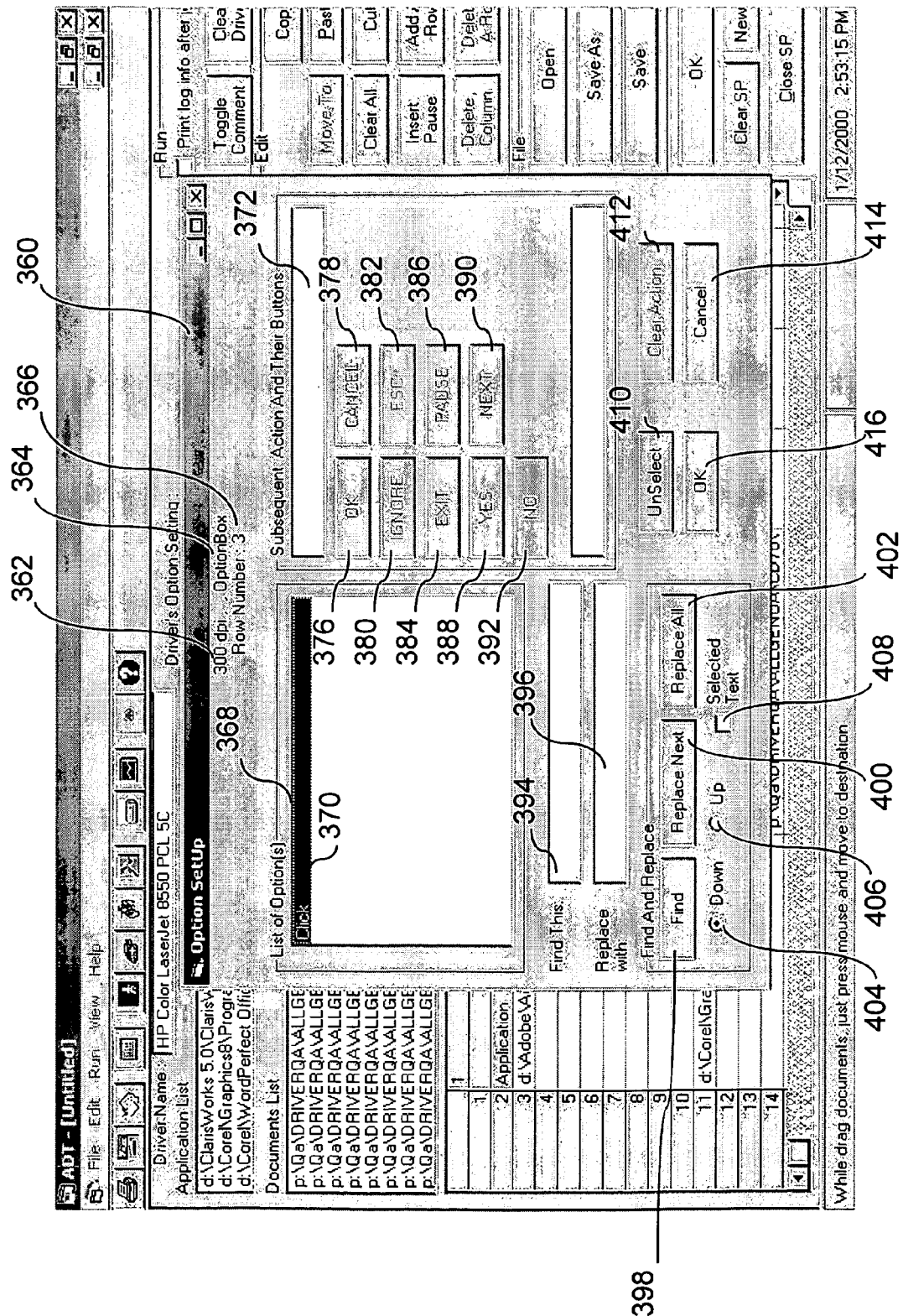
FIG. 11 illustrates an option setup window of the ADT procedure in accordance with an embodiment of the present invention.

As shown in FIG. 11, to select options, the option setup window 360 is displayed when the user double clicks on a cell in the control values area 322 (FIG. 8) of the spreadsheet. To generate the exemplary option setup window 360 of FIG. 11, the user double-clicked on the control option for 300 dpi in row three. In the option setup window 360, the option caption 362, type of control 364, and row number 366 are displayed. A "list of option(s)" area 368 displays available settings or values for the control option. In this example, the only setting or value for the option 370 is "Click."

Alternately, print option controls of a driver are placed on tab controls (18, FIG. 1). The auto-learn process determines which tab control the driver option is on, if there is more than one tab control in the driver, and which page of that tab control that print driver option is on. The value of the tab control and which page of that tab control that the driver option is on is recorded in a numerical string, called the controlID, so that the test-engine 70 (FIG. 2) may easily navigate among the controls during testing. For example, for the tabbed pages 18 of FIG. 1 at least four available settings will be displayed (the number of available settings depends on the number of pages in the tab control); each setting selects a different page.

When the print driver displays a secondary pop-up dialog box from an option in the driver being selected, a predefined response to the secondary pop-up box may be provided using a subsequent action and their buttons text box 372. The subsequent action and their buttons text box 372 works with the OK, CANCEL, IGNORE, ESC, EXIT, PAUSE, YES, NEXT and NO buttons, 376, 378, 380, 382, 384, 386, 388, 390 and 392, respectively, to allow the user to specify subsequent button settings to be activated on the secondary pop-up dialog box. The test-engine 70 (FIG. 2) uses the specified subsequent button setting in the subsequent action and their buttons text box 372 to automatically respond to the secondary pop-up dialog box, after learning it.

The option setup window 360 allows a user to globally find and replace text in the control options portion of the spreadsheet. A "Find This" text box 394 specifies characters to search for. A "Replace with" text box 396 specifies the replacement characters. A find button 398 allows a user to initiate a search for the specified characters in the "Find This" text box 394. A "Replace Next" button 400 replaces the specified found characters with the replacement characters, and performs another search for the specified characters. A "Replace All" button 402 globally replaces the specified text with the replacement characters in the control options of the entire spreadsheet.

A down radio button 404 and an up radio button 406 specify the direction of the search. A selected text check box 408 allows a user to only search and replace among highlighted or selected cells of the spreadsheet.

An unselect button 410 allows the user to unselect a selected option in the list of options area 368. A clear action button 412 allows the user to clear the Subsequent Action and Their Buttons text box 372. A Cancel button 414 clears the option setup pop-up window 360 from the display and does not change the spreadsheet. An OK button 416 closes the option setup pop-up window 360 and makes the specified changes to the spreadsheet.

Conditional Responses

When a problem arises, some applications display a pop-up window informing the user of the problem. For example, an application may display a pop-up window stating "Can't find 'specified file' you should have installed for the document to run," "Can't find fonts," "File is read-only, do you want to open it anyway," "File needs conversion to new format," and "Do you want to save." To respond to these pop-up windows and continue testing, the test-engine retrieves the characters specified in one of the conditional text entries of the registration file. The conditional text entries are designated with the term "COND" at the end of their field name in the registration procedure.

The conditional responses are associated with specific events. When the event that is associated with the conditional response occurs, the test-engine accesses the registration file to retrieve the conditional response for that event. If the registration file has a conditional response for that event, the test-engine executes the predefined keystrokes of the conditional response. For example, when some applications are opened, a pop-up window is displayed and the application waits for the user to respond to the pop-up window. The test-engine will access the APPOPENCOND registration information in the registration file to retrieve the conditional response, if any. If a conditional response is found, the test-engine executes the keystrokes to automatically respond to the pop-up window to continue testing. If no pop-up windows interrupt the testing, the instructions in the conditional text entry fields that are defined in the registration procedure and stored in the registration file are ignored.

For example, for one application, the APPPRINTCOND response is:

ENTER+--->1--->+N+ALT+d+ALT+o

When this APPRINTCOND response is executed, the enter character will be played, then the test-engine will wait one second, as designated by the sequence: --->1--->. The N character will be played, followed by playing the character corresponding to simultaneously hitting the "ALT" and "d"

keys, and followed by the character corresponding to simultaneously hitting the "ALT" and "o" keys.

Using the conditional responses, the test-engine has enhanced flexibility to automate the testing of print drivers with many different application programs, and reduce or eliminate user interaction with the print driver testing.

Fixing an Auto-Learned Control

Sometimes the auto-learn procedure 74 (FIG. 2) does not correctly identify a control. The ADT procedure provides a way for the user to correct improperly identified controls.

Referring back to FIG. 7, the user highlights the column in the spreadsheet 280 for which the driver option was incorrectly learned, then clicks on the fixit button 232 (FIG. 6) on the tool bar to invoke a fixit procedure 86 (FIG. 2). The fixit procedure 86 (FIG. 2) calls the print driver, navigates to the control of driver option which was incorrectly learned, and points a red arrow at the top left of the print driver option control that was incorrectly learned so the user can see the control of the print driver option. The fixit procedure 86 (FIG. 2) presents the user with a fixit window that allows the user to change either the label by which the driver option control is recognized or the control type of the driver option control. When the user selects and approves a change, the fixit procedure 86 (FIG. 2) modifies the learned-controls file 76 (FIG. 2) accordingly.

In an alternate embodiment, referring back to FIG. 7, in the ADT window 270, a user can double click on a control in the driver's option setting area 278 and manually enter the correct information.

Learning an Omitted Control

The auto-learn procedure 74 (FIG. 2) automatically identifies and stores information describing the controls of a driver in a learned controls file 76 (FIG. 2) for each driver. Sometimes the auto-learn procedure 74 (FIG. 2) does not identify a control. However, the user can force the auto-learn procedure to learn the control. To force the auto-learn procedure to learn the control, the user manually activates the print driver and selects the omitted control. The user then activates the manual-learn button 230 and the auto-learn procedure will learn the control and update the learned-controls file for that driver.

An Exemplary Learned-Controls Index File

The learned-controls index file 78 (FIG. 2) associates each driver, by name, with a learned-controls file 76 (FIG. 2). An exemplary learned-controls index file is as follows:

| | |
|---|---|
| Print Driver 1 | 00001.fnd |
| Print Driver 2 | 00002.fnd |
| Print Driver 3 | 00003.fnd |

The test-engine 70 (FIG. 2) automatically logs predefined events with dates and times. The predefined events at least include a date and time of the test, the name of the spreadsheet used for the test, when a row of the spreadsheet begins execution, when the application is opened, the result of opening the application, opening a document and the result of opening the document, and exercising a control and the result of exercising the control. An exemplary log of the processing of one row, row 3, is as follows:

```
5/5/99, 10:10:43 AM
>>>Tab separated text file is C:\QA\TOOLS\ADT\ACCPT9~1.SPD
>>>-------------------------------------------------------
>>>5/5/99, 10:10:58 AM: Running Row #3 of the Spreadsheet.
>>>-------------------------------------------------------
>>>5/5/99, 10:11:21 AM: Success: Application Adobe Illustrator opened.
>>>5/5/99, 10:11:21 AM: Opening Document:
k:\DRIVERQA\TESTFILE\ACC95NT\AI41G123.AI
>>>5/5/99, 10:11:45 AM: played APPOPENDOCCOND ({ENTER})
>>>5/5/99, 10:11:45 AM: Success: Document
k:\DRIVERQA\TESTFILE\ACC95NT\AI41G123.AI is opened.
>>>5/5/99, 10:11:51 AM: Driver successfully started.
>>>5/5/99, 10:11:56 AM: Control #1.1.5, &Portrait:
>>>Exercising OptionBox &Portrait
>>>5/5/99, 10:12:10 AM: Success: OptionBox Clicked.
>>>5/5/99, 10:12:21 AM: Control #1.1.13, Paper &source::
>>>Exercising ComboBox Paper &source:
>>>5/5/99, 10:12:28 AM: Success: exercised ComboBox item AutoSelect Tray.
>>>5/5/99, 10:12:36 AM: All Options in row have been exercised.
>>>5/5/99, 10:12:36 AM: OK button will be clicked to validate settings next
>>>5/5/99, 10:12:37 AM: Control #0.0.10, OK:
>>>Exercising PushButton OK
>>>5/5/99, 10:12:51 AM: Success: Button Clicked.
>>>5/5/99, 10:12:54 AM: Completed setting options for this row.
>>>5/5/99, 10:13:01 AM: Printing document.
>>>5/5/99, 10:13:23 AM: Looking for unknown popups.
>>>5/5/99, 10:13:23 AM: Pop-up is child of app. Looking for spooler pop-up . . .
>>>5/5/99, 10:13:34 AM: Found app back.
>>>5/5/99, 10:13:34 AM: Spooled job. On its way to the printer . . .
>>>5/5/99, 10:14:05 AM: Success Closing Application Adobe Illustrator.
>>>5/5/99, 10:14:07 AM: Done.
```

Because the test-engine automatically generates a detailed log, as shown above, the user can quickly and easily identify applications, documents and control options in which failures occurred.

Internal Structure of the Spreadsheet File

The spreadsheet file has at least four lines. The first line of the spreadsheet file names the driver and, in one embodiment, appears as follows:

DRIVER NAME: Print Driver 1

The second line of the spreadsheet file describes all tab control objects (18, FIG. 1). In this description, the term "tab stop" refers to a tab control "Page." An exemplary second line of the spreadsheet file is follows:

1.0.0,TabControl,SysTabControl, 1,29,9,375,349,4,,,,

In the exemplary second line above, the "1.0.0" is the control identifier (ID) assigned by the auto-learn procedure to the one tab control object found. "TabControl" is the ADT control type designation of the control. "SysTabControl" is the class name. The control's ordinal number is "1." The control's relative location with respect to the screen position of the driver on the display is 29,9. The control's height and width are 375 and 349, respectively. The "4" indicates the total number of tab stops or tab pages for the tab control.

The control ID is an internal classification number that is associated with each control option. The control ID is a numerical string sequence of three numbers, delimited by periods. Each control is associated with a specific page of a Tab Control. Within each Tab Control page, ADT navigates to the controls using the tab character. The first number indicates the tab control that the print driver option control is on. The second number indicates the page (tab stop) of that tab control that the driver option is on. The third number is a unique number representing a specific printer control option, and only that printer control option. For example, for the fifth printer control option, the numerical sequence is "1.2.5." Because Tab Controls are at the highest level of control options, the third number is zero for Tab Controls. More generally, for Tab Controls, the second and third numbers are equal to zero. For example, if a print driver has three tab controls, the first, second and third tab controls will be associated with the controlIDs of "1.0.0," "2.0.0" and "3.0.0," respectively.

The third line of the spreadsheet file describes the controls found in the driver except for their labels or captions which are described below. The description includes driver control characteristic such as the controlID, control type, control's class name, control's ordinal number, and the control's location with respect to the top left corner of the driver control window. The driver control characteristics are delimited by commas. The controls are separated by tab characters. For example, a portion of the third line is as follows:

1.1.1,OptionBox,Button, 1, 194,81,20,97 1.1.2, OptionBox, Button,2,194,207,20,87 1.1.3, PushButton, Button,1,366,24, 23,98 . . . .

The print driver control characteristics are used to set driver options and to read back the driver options using predefined functions in VISUAL TEST™ (Registered Trademark of Rational Software Corporation) as well as the WINDOWS application programming interface. In an alternate embodiment, the driver control characteristics are used to set driver options and to read back the driver options using predefined functions in the MICROSOFT WINDOWS™ application programming interface.

The class name is the name of the object to which that control belongs. The control's class name is assigned by either the operating system, such as MICROSOFT WINDOWS™, or by the print driver designer. The class name may not resemble the function of the control itself. For example, the class name for the Microsoft WORD open dialog box version 8.0 is "bosa_sdm_Microsoft Word 8.0." In addition, class names may be used ambiguously. As shown in the exemplary third line of the spreadsheet above, both an OptionBox and a PushButton have a class name of "Button."

To more quickly identify the control type of a print driver option control, the ADT procedure is installed with a list of common and well known classes and their associated control types. This list is stored in a known-class file called "Kwn-Class.txt." When the ADT procedure is executed, the known-class file is loaded into memory like the registration file. An exemplary portion of the known-class file for a combo box control type is as follows:

>>[ComboBox]

>>

>>ComboBox

>>ThunderComboBox

>>TcomboBox

The text in the square brackets includes the ADT procedure's internal name for the control type. Subsequent lines list the known classes that implement the combo box control. For example, when the auto-learn procedure identifies a control with a class name of TcombBox, the auto-learn procedure 74 (FIG. 2) accesses the known-class file, and identifies the control as a ComboBox based on its class name of TcombBox.

When two control types have the same class name, or when the class name is not listed in the known-class file, the auto-learn procedure uses other techniques to identify the control, based on a control's properties and behavior. If those techniques fail, the user has the option of using the "fixit" procedure of the ADT procedure.

In one technique for learning a control type of an unidentified control, the auto-learn procedure pretends that the unidentified control is one of the known controls in the known-controls file. The auto-learn procedure exercises the unidentified control as if it were each of the controls in the known-controls file. After exercising the unidentified control as if it were a particular control type, the auto-learn procedure reads back a response from exercising the unidentified control. The response is known for each type of control and differs based on the type of control. For example, the auto-learn procedure may pretend that the unidentified control is a checkbox, and attempt to read its value. If the auto-learn procedure receives an expected response, such as "checked", the auto-learn procedure attempts to confirm the control type by setting the control to its opposite value, such as "unchecked." The auto-learn procedure then attempts to read the current value of the unidentified control. For the checkbox, if the current value is still "checked", that control is not a checkbox and a control type of "check box" is eliminated. If the current value is "unchecked", the auto-learn procedure places the control type of "check box" on a list of potential control types for that control. The auto-learn procedure continues to attempt to eliminate control types based on the properties and behaviors of the unidentified control when exercised as though it were each known control in the known-controls file. In most cases, a single control type will remain on the list of potential control types and the control is identified.

Sometimes, the list of potential control types has multiple potential control types. In this case, the unidentified controls are often either an option box, a check box or a command button (also known as a push button). The auto-learn procedure uses the ordinal number properties. A control of a particular type on a tab stop rarely has the same ordinal number as that of a different control of the same type on the same tab stop. For instance, if two push buttons are on tab stop three of the same tab control, those two push buttons probably have different ordinal numbers. When the unidentified control has the same ordinal number as a known control on the same tab stop, that known control type is eliminated from the list of potential control types. The auto-learn procedure compares the ordinal number for the unidentified control, to the ordinal number for each identified control for that tab stop and eliminates control types having the same ordinal number from the list of potential control types. In this way, the auto-learn procedure identifies the control type for most unidentified controls.

The control type is a reserved internal ADT designation for the control. A set of internal control types includes the following control types: TabControl, ListBox, CmdButton, EditBox, OptionBox, CheckBox, ComboBox, FileListBox, DirListBox and DriveListBox. In particular, to determine the control type, the auto-learn procedure uses a process of elimination. There are a predefined number of different controls. Each control has predefined operational characteristics. To identify the controls, the auto-learn procedure executes the print driver and retrieves the handle for each control. The handle is used to access the control to retrieve information from and to set the control to a specified value. For each control, using the handle, the auto-learn procedure operates that control as if the control were each of the predefined controls. When a control is accessed incorrectly, an error will be returned. Therefore, when a control is successfully accessed as a particular predefined control, the auto-learn procedure has correctly identified the control despite its class name.

The control's ordinal number is a unique number per control type per tab stop which is set by the operating system, such as MICROSOFT WINDOWS™, or the driver designer. For example, if a first option box has ordinal number one on tab stop two, a second option box on the same tab stop most likely does not have the ordinal number of one because that ordinal number is used by the first option box. The second option box has an ordinal number of two.

The relative location of the control is with respect to the top left corner of the driver window rather than from the top left corner of the display. The first number of the geographical location is the vertical value of the control with respect to the absolute vertical position of the driver window on the display. The second number is the horizontal position with respect to the leftmost absolute screen position of the driver. The third number is the height of the control, and the fourth is the width of the control.

Some of the control characteristics are used to retrieve the handle that the operating system, such as MICROSOFT WINDOWS™, assigns to each control. The handle is used to access and exercise the control and is retrieved when the driver is executed. The handle for each control is unique and typically does not change while the driver is executing. The handle does change at separate executions of the driver.

The fourth line of the spreadsheet file lists the captions or labels of the controls. The captions are the text descriptions of the controls that are displayed such as "Landscape" and "Paper Size." The captions are also displayed on the spreadsheet. An exemplary fourth line is shown below:

Application Document Files &Portrait &Landscape More& Options . . . A&bout . . . Restore &Defaults OKCancel &Apply Paper &source:Paper:si&ze: &None &Coarse &Fine &line art &Error diffusion After listing the "Application" and "Document Files" labels, the controls are separated by tabs. The ampersands designate that the next character is to be underlined when displayed.

The fifth and following lines of the spreadsheet file (corresponding to rows four and up of the GUI spreadsheet) describe the application's full path name, the document's full path name, and selected driver option values, separated by tabs. For example, if the control is a combo box listing paper sizes, one entry may appear as follows: "A4 210×297 mm." If the third and fourth lines place the control option to designate the paper size in the fifth column, that entry in the fifth and following lines would be preceded by four tab characters.

A Template File

A user may create and open a template file 84 (FIG. 2). A template file 82 (FIG. 2) is the same as a spreadsheet file without driver information, including driver control options. The template file is especially useful when the user has a large number of application programs and documents and wants to use those same application programs and documents to test many print drivers. Using the ADT window, the template file can be retrieved, a new driver may be selected, driver control options may be set, and the resulting combination of applications, documents, driver and driver control options may be stored in a spreadsheet.

An Exemplary Implementation

In one implementation, the ADT window was created using MICROSOFT VISUAL BASIC 5.0™ (Registered Trademark of Microsoft Corporation). The test-engine, also known as ADTRun, also sends the document to the printer, sets the driver options, and monitors the spooler so that the spooler does not interfere with the testing. In one implementation, the test-engine and the auto-learn procedure were designed using VISUAL TEST 4.0™ (Registered Trademark of Rational Software Corporation) and compiled into pseudo-code. Alternately, the test-engine and auto-learn procedures are compiled to generate object code.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

What is claimed is:

1. A method of testing a print driver in a computer system, comprising:
   generating a driver-test data structure that identifies a plurality of applications and a list of specific documents, the driver-test data structure including information associating each of a plurality of the identified applications with specific respective documents;
   automatically testing said print driver by processing said driver-test data structure to open a plurality of said identified applications and a plurality of said associated documents and printing said plurality of associated documents using said print driver.

2. The method of claim 1 further comprising:
   selecting one or more print options associated with said driver as selected print options, wherein said generating generates said driver-test data structure with said associated applications and documents and said print options, and said processing said driver-test data structure includes setting said selected print options.

3. The method of claim 1 further comprising:
   providing a graphical interface to associate said applications and documents.

4. The method of claim 3 further comprising:
   including a spreadsheet in said graphical user interface to associate said applications and documents with said print driver.

5. The method of claim 1 further comprising:
   prior to said generating, registering one or more of said applications.

6. The method of claim 1 wherein the computer system has a plurality of installed print drivers, further comprising:

automatically learning a plurality of print options of one of the plurality of installed print drivers to provide learned-controls;

selecting said one of said plurality of installed print drivers as a test-print driver; and providing a graphical user interface to set at least one of said plurality of print options to a predetermined value, wherein said generating generates said driver-test data structure with said associated applications and documents, and includes said predetermined value of said at least one of said print options, and said processing said driver-test data structure to open said associated applications and documents includes setting said at least one of said plurality of print options to said predetermined value.

7. The method of claim 1 further comprising:
printing each of said documents.

8. The method of claim 1 further comprising:
generating a log while processing said driver-test data structure.

9. A computer program product for use in conjunction with a computer system, the computer program product for testing a print driver in a computer system, the computer program product comprising a computer readable storage medium and a computer program mechanism embedded therein, the computer program mechanism comprising:

instructions to generate a driver-test data structure that identifies a plurality of applications and a list of specific documents, the driver-test data structure including information associating each of a plurality of the identified applications with specific respective documents; and a test-engine to automatically open a plurality of said associated applications and a plurality of said associated documents identified in said driver-test data structure, and to print said plurality of opened documents using said print driver so as to test said print driver.

10. The computer program product of claim 9 further comprising:

instructions to select one or more print options associated with said driver as selected print options, wherein said instructions to generate include instructions that generate said driver-test data structure with said associated applications and documents and said print options, and said test-engine further includes instructions to open said associated applications and documents with said selected print options.

11. The computer program product of claim 9, wherein the computer program mechanism further comprises:

instructions to provide a graphical interface to associate said applications and documents with said print driver.

12. The computer program product of claim 9, wherein the computer program mechanism further comprises:

an edit known application procedure to register one or more of said applications.

13. The computer program product of claim 9, wherein said computer program mechanism further comprises:

an auto-learn procedure to automatically identify a plurality of print options of an installed print driver;

instructions to select said installed print driver as a test-print driver; and instructions to provide a graphical user interface to set at least one of said plurality of print options to a predetermined value, wherein said instructions that generate include instructions that generate said driver-test data structure with said associated applications and documents, and include said predetermined value of said at least one of said plurality of print options; and instructions to set said at least one of said plurality of print options to said predetermined value, thereby testing said test-print driver.

14. The computer program product of claim 9, wherein said computer program mechanism further comprises:

instructions to provide a spreadsheet to associate said applications and documents.

15. The computer program product of claim 9, wherein said computer program mechanism further comprises:

instructions to print each of said documents.

16. The computer program product of claim 9, wherein said computer program mechanism further comprises:

instructions to generate a log while executing said test engine.

17. A computer system for testing a print driver, comprising:

memory to store:

instructions to generate a driver-test data structure that identifies a plurality of applications and a list of specific documents, the driver-test data structure including information associating each of a plurality of applications with specific respective documents; and a test-engine to automatically open a plurality of said associated applications and a plurality of said associated documents identified in said driver-test data structure, and to print said plurality of opened documents using said print driver so as to test said print driver; and a processor to execute said instructions and said test-engine stored in said memory.

18. The computer system of claim 17 wherein said memory further comprises:

instructions to select one or more print options associated with said driver as selected print options, wherein said instructions to generate include instructions that generate said driver-test data structure with said associated applications and documents and said print options, and said test-engine further includes instructions to open said associated applications and documents with said selected print options.

19. The computer system of claim 17 wherein said memory further comprises:

instructions to provide a graphical interface to associate said applications and documents with said print driver.

20. The computer system of claim 17 wherein said memory further comprises:

an edit known application procedure to register one or more of said applications.

21. The computer system of claim 17 wherein said computer system has a plurality of installed print drivers, and said memory further comprises:

an auto-learn procedure to automatically identify a plurality of print options of one of the plurality of installed print drivers;

instructions to select said one of said plurality of installed print drivers as a test-print driver; and instructions to provide a graphical user interface to set at least one of said plurality of print options to a predetermined value, wherein said instructions that generate include instructions that generate said driver-test data structure with said associated applications and documents, and include said predetermined value of said at least one of said plurality of print options, and said test-engine includes instructions to set said at least one of said plurality of print options to said predetermined value, thereby testing said test-print driver.

22. The computer system of claim 17 wherein said memory further comprises:

instructions to provide a spreadsheet to associate said applications and documents with said print driver.

23. The computer system of claim 17, wherein said memory further comprises:

instructions to print each of said documents.

24. The computer system of claim 17, wherein said memory further comprises:

instructions to generate a log while executing said test engine.

* * * * *